(No Model.)

S. BRAY.
JOINING GLASS MOSAICS.

No. 349,424. Patented Sept. 21, 1886.

Witnesses:
William H. Parry.
W. R. Marble.

Inventor:
Sanford Bray,
by Sylvenus Walker
Attorney

UNITED STATES PATENT OFFICE.

SANFORD BRAY, OF BOSTON, MASSACHUSETTS.

JOINING GLASS MOSAICS.

SPECIFICATION forming part of Letters Patent No. 349,424, dated September 21, 1886.

Application filed December 23, 1885. Serial No. 186,577. (No model.)

*To all whom it may concern:*

Be it known that I, SANFORD BRAY, of the city of Boston, in the county of Suffolk and State of Massachusetts, have invented a new and useful Improvement in Joining Glass Mosaics, of which the following is a specification.

The objects of my invention are to provide a cheap, simple, convenient, and expeditious means for joining colored-glass mosaics for church-windows and other ornamental purposes, and it relates to that class of stained-glass mosaic windows wherein the different-colored pieces of glass are united together and held in position by means of grooved lead sash; and it consists in the novel construction of the several parts of the sash or frame and uniting the pieces together, as hereinafter more fully described and specifically set forth in the claims.

Figure 1:
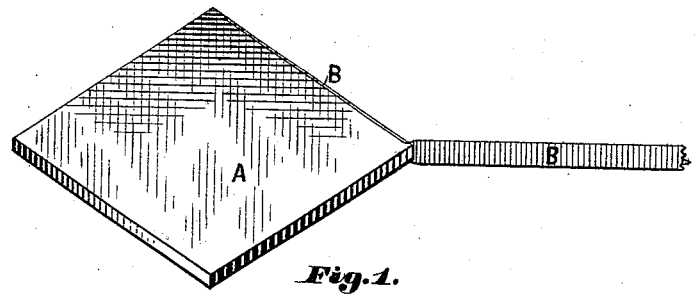
Figure 2:
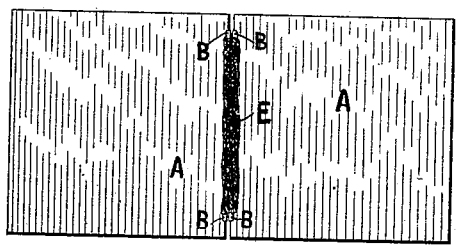
Figure 3:
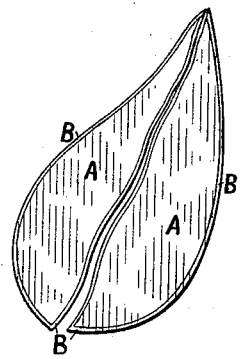

Figure 1 represents a perspective view of a piece of glass showing my invention being applied. Fig. 2 represents a plan view of two pieces of glass placed edge to edge and secured according to my invention. Fig. 3 represents two pieces of glass representing the opposite halves of a leaf prepared and placed in position, so as to be united with solder and form a tapering stem for the leaf.

A represents pieces of colored glass, which may be of any form, size, and color desired, as now and heretofore employed in the construction of colored or stained glass mosaic windows for churches and other buildings, and in which the mosaics or several pieces of colored glass forming the designs or ornamental representations have been held in position and connected together by means of grooved bars of lead forming a metal sash extending between the various pieces.

B represents thin strips of sheet metal. I prefer copper or copper-foil cut a proper width to correspond with the thickness of the pieces of colored glass to the edges of which it is to be attached or secured by any suitable adhesive substance, japan, or prepared resin and oil, shellac, varnish, balsam, or any other well-known liquid adapted thereto. These strips of copper-foil B are cut a little wider than the thickness of the glass to the edges of which they are to be stuck, and turned over upon the opposite sides of the piece of glass A, so as to be stuck down thereon, forming a narrow border or frame, as shown. The pieces of colored glass A, being provided with the strips of copper foil B, are placed in position edge to edge, and a suitable flux of resin or other soldering material or acid applied to joints and a piece of solder, a hot soldering-iron passed over or upon the same, the solder E is melted so as to fill the interstices and form a coat or body on the opposite turned-over edges of the said strips of copper-foil B, as shown in Fig. 2, thereby securing the pieces together in a very permanent manner, especially when soldered upon both sides. It will be seen and understood that the joints thus formed will allow the contiguous edges of the pieces of mosaic glass to be brought very near or close together, so as to form a joint that will show but very little in comparison to the old grooved lead frame heretofore employed; and if it be desired that the soldered joint shall represent the stem of a leaf, or the branch or stem of a flower, the joint may be left more open at the lower end portion, so that when the contiguous edges of the opposite halves or sides of the same are soldered the stem shall have the natural tapering form, as represented in Fig. 3. When it is desired to form a very fine, narrow joint, so as to show but little, the strips of copper-foil B are to be cut of a width corresponding to the thickness of the glass pieces to be joined and stuck upon the edges only and then brought together and soldered as before.

By means of my improved joint, cylinders, cones, and globe-shaped shades or other irregular forms may be produced with the same facility as flat surfaces; and it is equally adapted for uniting and joining irregular broken pieces of greatly-varying thickness, or molded pieces, crystals, and other irregular-formed pieces of glass, or other desired materials.

Having thus described my invention in detail, what I claim is—

1. The method of joining and uniting mosaics, consisting in providing the meeting edges with adhesive strips of thin metal, then soldering the metal joints together, as and for the purposes set forth.

2. The combination, with the pieces A, of the adhesive metal strips B, soldered together, as described.

SANFORD BRAY.

Witnesses:
SYLVANUS WALKER,
WILLIAM H. PARRY.